United States Patent Office 3,225,058
Patented Dec. 21, 1965

3,225,058
SUBSTITUTED N-(4-PYRIMIDINYL)-6-
AMINOPENICILLANIC ACIDS
Peter F. Juby, Syracuse, N.Y., assignor to Bristol-Myers
Company, New York, N.Y., a corporation of Delaware
No Drawing. Filed Sept. 4, 1963, Ser. No. 306,602
5 Claims. (Cl. 260—306.7)

This invention relates to certain novel antibacterial agents and, more particularly, to certain substituted N-(4-pyrimidinyl)-6-aminopenicillanic acids and their salts.

The compounds of the present invention are effective antibacterial agents against Gram-positive bacteria, and particularly against penicillinase-producing Staphylococci, and are thus useful both in the laboratory, e.g. to remove such organisms when found as contaminants, and in therapy in man and animals.

There is thus provided, according to the present invention, the series of compounds having the formula

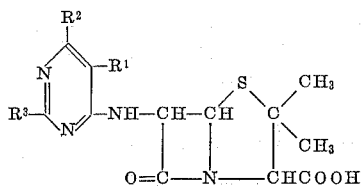

wherein $R^1$ is hydrogen, nitro, amino or

in which $R^4$ represents (lower)alkyl; and $R^2$ and $R^3$ are each hydrogen, (lower)alkyl, amino, phenyl or substituted phenyl such as halophenyl, tolyl, xylyl or (lower)alkoxyphenyl; and their nontoxic pharmaceutically acceptable salts.

The nontoxic, pharmaceutically acceptable salts include metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N, N'-dibenzylethylenediamine, dehydroabietylamine, N,N'-bis - dehydroabietylethylenediamine, N - (lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g. "(lower)alkoxy," it refers to the alkyl portion of such group which is therefore as described above in connection with "(lower)alkyl." Also included within the scope of the present invention are easily hydrolyzed esters and amides which are converted to the free acid form by chemical or enzymatic hydrolysis.

Preferred series or compounds of the present invention are those in which $R^1$ represents carbalkoxy and $R^2$ and $R^3$ represent hydrogen or (lower)alkyl; in which $R^1$, $R^2$ and $R^3$ represent hydrogen; in which $R^1$ and $R^3$ represent —NH$_2$ and $R^2$ is hydrogen; and in which $R^1$ is —NO$_2$ and $R^2$ and $R^3$ are hydrogen.

The 4-chloropyrimidines used herein as starting materials are prepared according to the procedures set forth in the literature, e.g. Bredereck et al., Chem. Ber. 95, 803 (1962) and The Chemistry of the Carbon Compounds by Victor von Richter, Third English Edition, Vol. IV, pages 288–291, Elsevier Publishing Co. Inc., New York, N.Y., 1947, and references therein.

The products of the present invention are prepared by the reaction in a molar ratio of about 0.5–2.0, and preferably of about 1, of the appropriate 4-chloropyrimidine with 6-aminopenicillanic acid which is preferably in the form of a salt such as a tertiary hydrocarbonyl or aliphatic amine, e.g. triethylamine. The reagents are mixed in an inert solvent such as methylene chloride at about 0°–30° C. for up to a few hours. The product so produced is an acid and can be isolated by the methods used to isolate benzylpenicillin and other penicillins as either the free acid or a nontoxic, pharmaceutically acceptable salt thereof.

The following examples will serve to illustrate the present invention without limiting it thereto.

EXAMPLE 1

N-(5-carboethoxy-4-pyrimidinyl)-6-aminopenicillanic acid

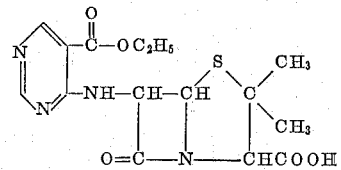

6-aminopenicillanic acid (21.6 g.) and triethylamine (20.2 g.) were stirred in methylene chloride (400 ml.) at 30° C. for two hours until most of the 6-aminopenicillanic acid had dissolved. A solution of 5-carboethoxy-4-chloropyrimidine (18.6 g.) in methylene chloride (150 ml.) was added slowly to the 6-aminopenicillanic acid solution, the latter being cooled in an ice-water bath. The combined solution was allowed to come to room temperature (ca. 30° C.) over a period of thirty minutes and was then stirred at room temperature for a further two hours.

The solution containing the product as its triethylamine salt was filtered and the filtrate reduced to dryness in a rotating evaporator at 30° C. The oily residue was taken up into solution in ice-water (200 ml.) and the aqueous solution was washed with ether (100 ml.). The pH of the aqueous solution was lowered to 3.25. A solid separated from the solution at pH 3.25–5. The solid was removed by filtration and the aqueous filtrate was extracted with portions of ethyl acetate (4×100 ml.). The ethyl acetate extracts were combined and quickly dried over anhydrous sodium sulphate. The ethyl acetate was removed on a rotating evaporator at 30° C., leaving the acid form of the product as a pale yellow solid residue (8.5 g.).

The solid product was dissolved in the minimum quantity of warm ethyl acetate, and the solution treated with decolorizing charcoal, filtered and cooled. The very pale orange crystalline solid which formed was recrystallized from ethyl acetate to give a very pale yellow crystalline product (2.0 g.). The product did not have a melting point, but finally turned black and decomposed at 150–155° C. Infrared and proton magnetic resonance spectra of the product were as expected for N-(5-carboethoxy-4-pyrimidinyl)-6-aminopenicillanic acid.

*Analysis.*—Calc'd. for $C_{15}H_{18}N_4O_5S$: C, 49.18; H, 4.95; N, 15.29; S, 8.75. Found: C, 49.00; H, 4.91; N, 14.55; S, 9.02.

This product was found to inhibit *Staph. aureus* Smith at about 3.1 mcg./ml. and to inhibit *Staph. aureus* BX-1633, which is highly resistant to benzylpenicillin, at 3.1 mcg./ml.

EXAMPLE 2

*N-(5-carboethoxy-2-methyl-4-pyrimidinyl)-6-aminopenicillanic acid*

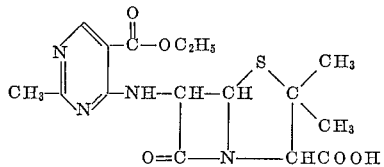

6-aminopenicillanic acid (2.16 g.) and triethylamine (2.02 g.) were stirred in 40 ml. methylene chloride at 25°–26° C. for 90 minutes until most of the 6-aminopenicillanic acid had dissolved. A solution of 5-carboethoxy-4-chloro-2-methylpyrimidine (2.00 g.) [A. R. Todd and F. Bergel, J. Chem. Soc. 364 (1937)] in 20 ml. methylene chloride was added slowly to the 6-aminopenicillanic acid solution at room temperature and the combined solution was stirred for four hours.

The solution was filtered and the filtrate was reduced to dryness in a rotating evaporator at 30° C. The oily residue of the product as its triethylamine salt was dissolved in 30 ml. ice-water and the aqueous solution was washed with 30 ml. ether. The pH of the aqueous solution was then lowered to 3.25. A solid separated from the solution at pH 3.25–5. The solid, which was probably unreacted 6-aminopenicillanic acid, was removed by filtration and the aqueous filtrate was extracted with four portions of 40 ml. ethyl acetate. The ethyl acetate extracts containing the product were combined and dried over anydrous $Na_2SO_4$. The ethyl acetate was removed on a rotating evaporator at 30° C. to leave the product, N - (5 - carboethoxy-2-methyl-4-pyrimidinyl)-6-aminopenicillanic acid, as a yellow solid which weighed 190 mgm. after drying in vacuo over $P_2O_5$ overnight. The infrared spectrum of the product was as expected for N-(5-carboethoxy - 2 - methyl - 4 - pyrimidinyl)-6-aminopenicillanic acid. The product did not have a melting point but decomposed upon heating between 115° and 125° C.

I claim:
1. A member selected from the group consisting of a compound of the formula

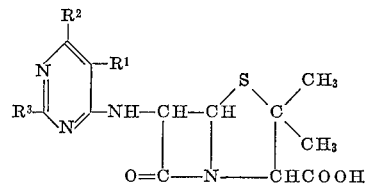

wherein $R^1$ represents carbalkoxy and $R^2$ represents hydrogen and $R^3$ represents a member selected from the group consisting of hydrogen and (lower)alkyl; and non-toxic, pharmaceutically acceptable salts thereof.

2. A compound of the formula

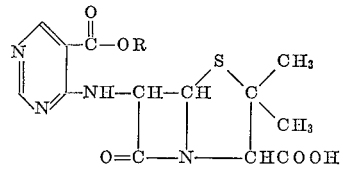

wherein R represents (lower)alkyl.

3. A compound of the formula

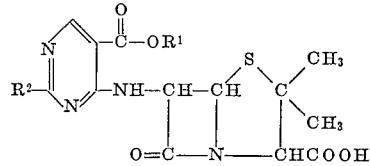

wherein $R^1$ and $R^2$ each represent (lower)alkyl.

4. A compound of the formula

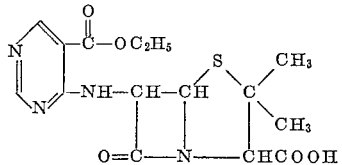

5. A compound of the formula

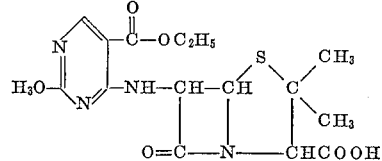

No references cited.

NICHOLAS S. RIZZO, *Primary Examiner.*
JAMES W. ADAMS, *Assistant Examiner.*